United States Patent
Bradley

(10) Patent No.: US 6,546,299 B1
(45) Date of Patent: Apr. 8, 2003

(54) MACHINE AND METHOD FOR MANIPULATING DIGITAL AUDIO

(76) Inventor: Martin Fitzgerald Bradley, 8944 S. Emerald, Chicago, IL (US) 60620

( * ) Notice: Subject to any disclaimer, the term of this patent is extended or adjusted under 35 U.S.C. 154(b) by 0 days.

(21) Appl. No.: 09/324,076

(22) Filed: Jun. 1, 1999

(51) Int. Cl.[7] .......................... G06F 17/00; G11B 21/08
(52) U.S. Cl. .................... 700/94; 369/83; 369/30.09
(58) Field of Search ........................ 369/83, 47.13, 369/30.08, 30.09; 360/15; 700/94

(56) References Cited

U.S. PATENT DOCUMENTS

| | | | | |
|---|---|---|---|---|
| 4,817,075 A | * | 3/1989 | Kikuchi et al. | 360/15 |
| 5,408,449 A | | 4/1995 | Oh | 369/32 |
| 5,502,703 A | | 3/1996 | Yamada | 369/60 |
| 5,706,262 A | | 1/1998 | Yokota | 369/32 |
| 5,825,739 A | * | 10/1998 | Saito et al. | 369/47.13 |
| 5,952,598 A | | 9/1999 | Goede | 84/609 |
| 6,172,948 B1 | * | 1/2001 | Keller et al. | 369/83 |

\* cited by examiner

Primary Examiner—Forester W. Isen
Assistant Examiner—B. Tyrone Pendleton

(57) ABSTRACT

A CD player and three audio storage devices are coordinated using an interface(FIG. 1) which allows for a unique process of audio arrangement in which continuous intervals of audio are programed to be played from a CD in a specific order, each having a specific tempo and volume at which it is assigned to play. The process of forming an audio arrangement includes auditioning continuous intervals of audio directly from a CD in order to locate the precise position of desirable audio and then connecting these desirable intervals of audio so that each may be transmitted by this invention with a specific amount of timing with respect to the interval of audio that preceded it. After forming a program that specifies an audio arrangement, the CD player and the three audio storage devices can be used to further connect, blend, overlap, and otherwise mix the continuous intervals of audio read from one or several compact discs.

2 Claims, 3 Drawing Sheets

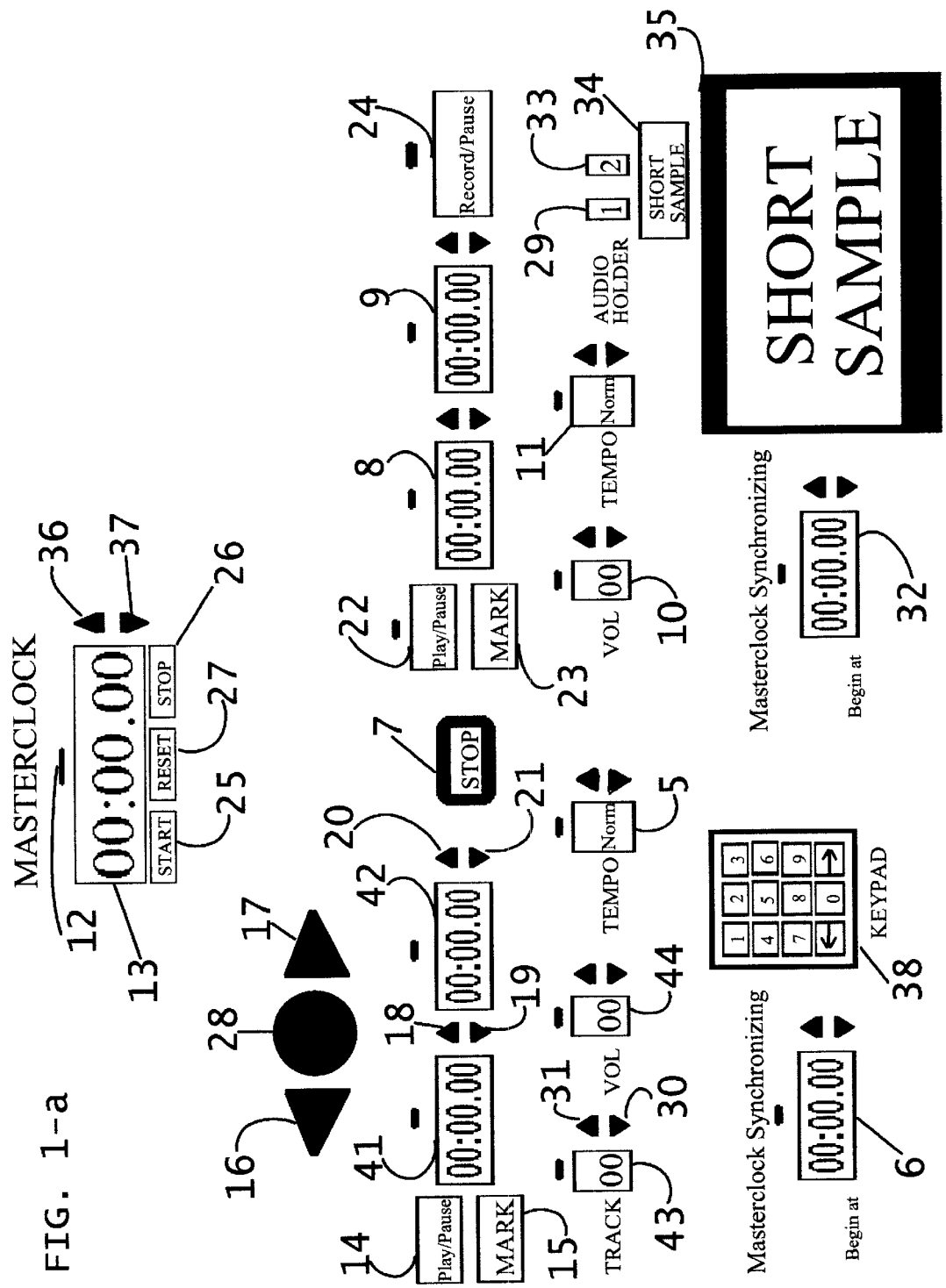
FIG. 1-a

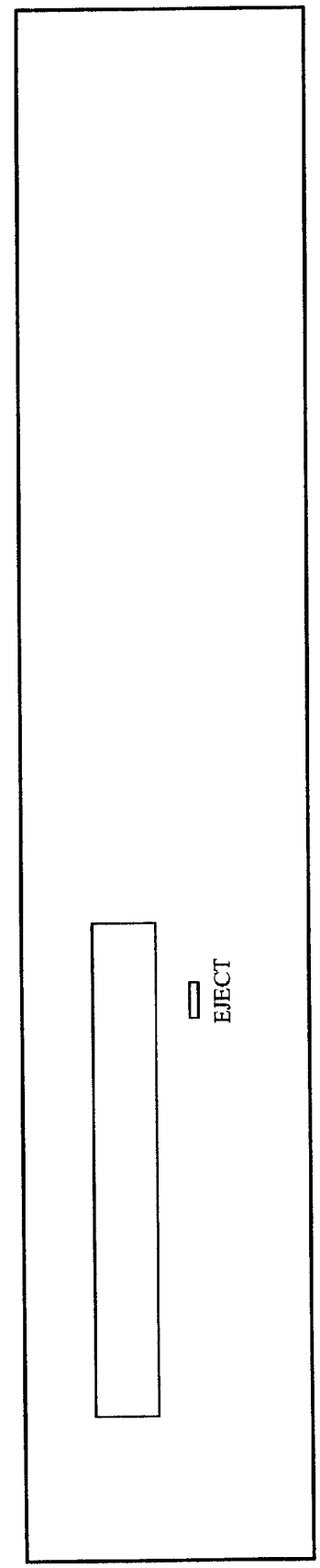
FIG. 1-b

MACHINE AND METHOD FOR MANIPULATING DIGITAL AUDIO

BACKGROUND

1. Field of Invention

This invention relates to the field of digital signal processing for the purpose of audio reproduction and manipulation. Particularly, the musical area of this field including professional disc jockey equipment such as dual compact disc players, and samplers as well as computer programs that allow for the manipulation of audio signals. This invention should be considered among all methods and systems for rearranging audio signals as they pertain to music.

2. Description of Prior Art

Creating alternate musical arrangements of and otherwise manipulating audio signals read from a compact disc has, to date, been achieved by computer programs or devices that complement a computer. This is unfavorable because it means that in order to manipulate the audio on a compact disc, one must first own a computer. Furthermore, computers require audio to be stored to memory first, then editing can only be performed on the audio in memory. This is limiting.

OBJECTS AND ADVANTAGES

This invention pioneers a new way of arranging and otherwise manipulating digital audio that will change the way people look at their compact disc collections. What is most special about this invention is that it is not an advance in technology as much as it is an advance in music. This invention gives a new insight into music.

The objects and advantages of this invention are:

(a) to introduce a unique process of music forming that is efficient and yields excellent command of the audio encoded on a compact disc;

(b) to provide a low-cost construction that readily connects to a stereo amplifier and fosters the development of brilliant musical compositions; and (c) to provide a format that induces and exercises the musical creativity of people and allows them to audition and otherwise transmit their own creative musical arrangements.

Further objects and advantages include whatever can conceivably be done with the music that is formed with and transmitted by this machine. For example, the music given by this machine can be used to complement a vocalist, fuel dance, or it may be fed back into the machine for further manipulation. Still further objects and advantages will become apparent from a consideration of the ensuing description and drawings.

DRAWING FIGURES

FIG. 1a shows a top perspective view of the present invention, which shows the main human interface of this invention.

FIG. 1b shows a side perspective view of the present invention, which shows the compact disc reception mechanism.

OPERATION

Figure 2:
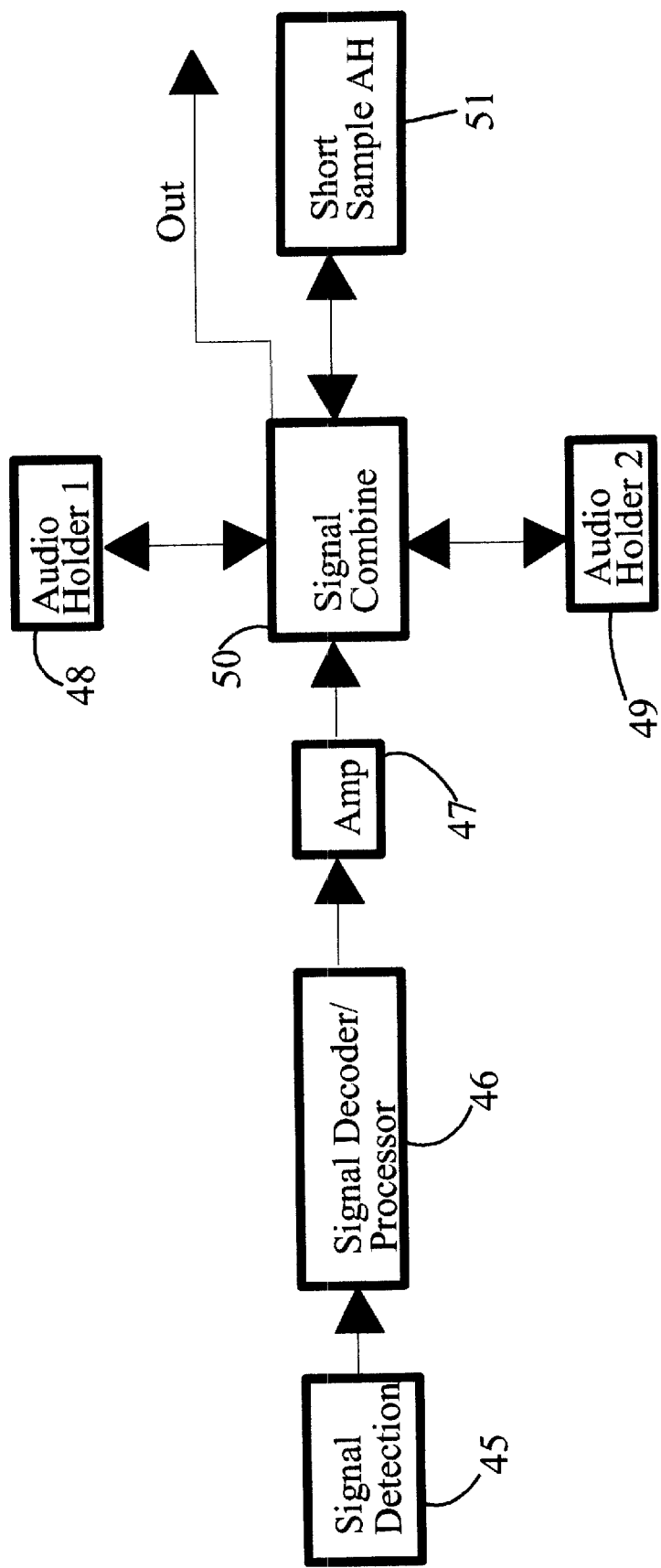
FIG. 2 shows a block diagram of the circuitry of this invention.

FIG. 1 is a diagram of the buttons and screens that make up the interface that allows for the operation of the present invention. Each screen has a light above it, such as the light 12 above the Masterclock screen 13. And each screen has up and down arrow buttons to their immediate right, such as the up and down arrow buttons 36 and 37 to the immediate right of the Masterclock screen 13. When either the up or down arrow button next to a screen is pressed, the light above that screen will glow indicating that numbers may now be entered to that screen either using the Keypad 38 or by using the up or down arrow buttons to change the number in the screen either incrementally or decrementally- integer by consecutive integer by order of smallest digit first.

Playing a Compact Disc (CD)

Like a conventional CD player, this invention functions to receive and play a standard audio CD at the standard bit rate. A CD may be played by pressing the Play/Pause button 14 once, the track number of the track being played will be displayed by screen 43 and the track's time count will be displayed by screen 41. The triangular shaped buttons by screen 43 can be used to change tracks, and the triangular buttons by screen 41 can be used for intratrack scanning which is a search function that allows a user to listen to the music played at a faster rate in either forward or rewind mode in order to find a certain passage contained within a single track. While a CD is in play, pressing the Play/Pause button 14 pauses its play; the Stop button 7 stops it's play. Finally the volume of the CD output can be controlled using the triangular buttons by screen 44.

For this patent, a sample is a continuous interval of audio that exist as or once existed as digitally encoded information contained on a CD. A sample is identified by its address which specifies the unique location on a CD in which the sample exists or originated from. A sample address includes a begin track number; an end track number; a begin time address; and an end time address. For example, a sample with address, "track 3,3[01:00.86,01:05.00]," refers to a sample that begins and ends in track three that starts from the time address 01:00.86 and ends at the time address 01:05.00, where the smallest digit displayed is a hundredth of a second. A sample may span between two consecutive tracks or include one or more whole tracks, in either case the begin and end track numbers will be different. For example, the statement,"track 2,3 [03:34.56,01:22.32]," refers to a sample that begins in track 2 at time address 03:34.56 and ends in track 3 at time address 01:22.32.

For this patent, an audio arrangement is an interval of audio that is made up of an arrangement of samples; each sample with a specific tempo and volume at which it is programmed to be transmitted to audibility; and each sample being arranged to be transmitted to audibility with a specific amount of timing with respect to the sample that preceded it. For example, consider the simple 2-sample audio arrangement below:

|  | Sample Address | Tempo | Volume |
| --- | --- | --- | --- |
| Sample 1 | Track3,3[00:00.56,00:26.75] | Norm | 08 |
| Sample 2 | Track2,3[04:45.63,00:45.65] | Norm | 08 |

The above audio arrangement shows 2 samples that are to be played in a specific order each sample having an address to identify its location on the CD, and each sample has its own tempo and volume at which it is arranged to play. The only aspect of the audio arrangement that is not shown is the timing that should exist between the 2 samples, this will be shown later.

The operation of this invention will generally begin with forming and entering an audio arrangement such as the one shown above.

Entering an Audio Arrangement

To enter the audio arrangement shown above, the operator must enter the first sample's begin time address(00:00.56) to screen 41 by pressing once either of the triangular shaped buttons 18 or 19 that are to the immediate right of screen 41, this will make the light above screen 41 glow. Then using the keypad 38 the begin time address of this sample may be entered. Then pressing once either of the triangular shaped buttons 30 or 31 that are to the immediate right of screen 43 will make the light above screen 43 glow along with the light above screen 41. This means the corresponding track number for the begin time address may be entered into screen 43 using the keypad 38 or the triangular shaped buttons 30 and 31 themselves. For this begin time address, the corresponding track number 3 will be entered. Then pressing once either of the triangular shaped buttons 20 or 21 that are to the immediate right of screen 42 will make the lights above screens 41 and 43 go dark, and the light above screen 42 glow, indicating that numbers may now be entered to screen 42. Then using the keypad 38 the end time address(00:26.75) of the first sample may be entered to screen 42. Then its corresponding track number must be entered to screen 43.

This machine allows a user to view and enter time addresses to an accuracy of 5 decimal places. In order to view a more accurate display, the left and right arrow buttons of the keypad 38 must be used. The left and right arrow buttons of the keypad 38 control the accuracy of each screens display, and also the ability of the operator to enter numbers to each screen. For example, if the numbers 87:65.43 are entered into screen 41 with the right most number symbolizing 30 milliseconds and left most number symbolizing 80 minutes, pressing the left arrow key of the keypad 38 adds a decimal place of accuracy by moving the numbers and their dividers over a notch making the 8 disappear so that screen 41 will now display 7:65.430, with the left most number symbolizing 7 minutes and right most number symbolizing 0 milliseconds. The left arrow button of the keypad 38 may be pressed until the most accurate display possible is shown. The number 6.54321 is an example of what can be shown in the screen's most accurate display— the left most number symbolizes 6 seconds and the right most number symbolizes 10 microseconds. The triangular shaped buttons next to each screen changes only the numbers in the 6digit display by order of smallest digit first, so any number not shown in the 6 digit display will not be changed until they are moved to the 6 digit display. When the user has entered the time address 00:26.75, the machine will assume 00:26.75000. The machine will be ready to display and accept changes to a number of this accuracy. This manipulation of accuracy becomes important when connecting two samples in the process of audio arrangement forming.

Now that the sample address of the first sample has been accurately entered, the volume and tempo at which it is desired to play must be entered. The number entered into screen 44 will specify the volume at which the sample will play. And the number entered into screen 5 will specify the tempo or bit rate at which the sample will be read from the CD. For our first sample we will enter a normal tempo and a volume of 8. After the sample is entered, it may be auditioned by pressing the Play/Pause button 14. In fact, whenever there is an interval of audio specified by the numbers in screens 41 and 42, that will be the interval of audio that will play when the Play/Pause button 14 is pressed. And that will be the interval of audio whose volume and tempo will show in screen 44 and 5. Auditioning samples allows the operator to decide what changes to make to a sample and is a large part of the creative process of forming an audio arrangement.

Now that the first sample's time addresses have been entered to screens 41 and 42, the big left arrow button 16 may be pressed to begin entering another sample that will follow the first. Pressing arrow button 16 will cause the time addresses to change screens to the left so the time address in screen 41 will disappear, however stored into memory, and the time address in screen 42 will move to screen 41 leaving screen 42 blank. The begin time address of the second sample may now be entered to screen 42. Once it has been entered pressing the arrow button 16 a second time will move the newly entered time address from screen 42 to screen 41 leaving screen 42 blank again. So now the end time address of sample 2 may now be entered to screen 42. To understand how the big arrow buttons 16 and 17 move time addresses from screen to screen, think of all the time addresses in an audio arrangement as connected in a train like fashion, consider the time addresses of our two samples: [00:00.56,00:26.75] [04:45.63,00:45.65], if all four of these time addresses have been entered into memory, then pressing the big left and right arrow buttons 16 and 17 will affect which two time addresses will be displayed in screens 41 and 42. For example, if the first sample's time addresses— 00:00.56, 00:26.75—show in screens 41 and 42 respectively, then pressing the arrow button 16 will make time addresses—00:26.75, 04:45.63—show in screens 41 and 42 respectively, then pressing the button 16 a second time will make time addresses—04:45.63, 00:45.65—show in screens 41 and 42 respectively. Then pressing arrow button 17 will make the time addresses move in the opposite direction.

By controlling which time addresses of an audio arrangement are displayed in screens 41 and 42, the operator is allowed to navigate an arrangement of samples in order to view and audition each sample with their accompanying tempos and volumes. And also to audition and analyze the timing between each pair of consecutive samples.

Timing Consecutive Samples

When screen 41 displays the end time address of one sample and screen 42 displays the begin time address of the following sample, these two time addresses represent the transition between the two samples or the point in which the samples connect. Since this machine allows its user to specify samples with an accuracy of 10 microseconds, after one sample finishes play, the next sample will begin playing at exactly 0.00001 seconds after the first. Consider the audio arrangement below, whose time addresses are exactly as shown.

|          | Track | Time Address      | Real Time          |
|----------|-------|-------------------|--------------------|
| Sample 1 | 3,3   | [6.00000, 9.00000]| [0.00000, 3.00000] |
| Sample 2 | 3,3   | [4.00000, 9.00000]| [3.00001, 8.00001] |

The above example shows how two samples that specify 8 seconds of audio will actually take 8.00001 seconds of real time to play because sample 2 starts playing at exactly 10 microseconds after sample 1 has ended.

To analyze the timing between two consecutive samples, the end time address of the first sample should be entered to screen 41 and the begin time of address of the second sample should be entered to screen 42. When this is done, the user will be able to listen to the way these two samples connect, that is the way one sample ends with respect to the way the next sample begins. In order to appreciate the way two samples sound so connected, the user must hear the continuous interval of audio that includes at least the last few seconds of the first sample and the beginning few seconds of the second sample along with the 10 microseconds that separates them. This is accomplished with a small amount of RAM working in conjunction with the CD Pickup. Since a CD Pickup can't usually move from one sample to another in 10 microseconds, it is necessary for it to be complemented with about 0.5 MB of RAM in order to allow for the unique method of sample connection which will be described later.

The user may wish to insert a certain amount of silence between two samples that is greater than the standard 10 microseconds. In this case the user should enter the end time address of the first sample to screen 41 and for the numbers entered to screen 42 there should be an accompanying track number of zero entered to screen 43. Now the time that is entered to screen 42 will specify the amount of silence that will exist before the second sample begins. The second sample will be entered by pressing the left arrow button 16 which will move the track zero time address to screen 41 from screen 42, and now that screen 42 is blank the user may proceed to enter the begin time address of the second sample. Consider the audio arrangement below.

|  | Track | Time Address | Real Time |
|---|---|---|---|
| Sample 1 | 3,3 | [6.00000, 9.00000] | [0.00000, 3.00000] |
| Silence 1 | 0 | [5.00000] | [3.00001, 8.00001] |
| Sample 2 | 3,3 | [4.00000, 9.00000] | [8.00002, 13.00002] |

This audio arrangement shows how entering a track zero time address specifies a certain amount of silence between two samples. In this case the second sample will begin playing 5.00002 seconds after the first sample has ended.

Creative Audio Arrangement

This invention allows for the creative process of forming an audio arrangement. This process begins with the user playing a CD normally in order to become familiar with all the audio it contains. Then once familiarity is established, the user may be drawn to one or more samples that are either aesthetically pleasing or otherwise interesting. The user may begin to enter these samples in order to audition them at different tempos and volumes in a process of experimentation. This process of experimentation is essential to creating a desirable musical arrangement and it will usually begin with the user entering samples using the Mark button 15.

The Mark button 15 allows the user to audibly determine and enter the desired begin and end points of a sample as the CD is being played. To use the Mark button 15, first the Play/Pause button 14 should be pressed, to begin playing a CD in the standard way. Once the CD begins playing, its time count will be displayed in screen 41. The operator of this invention must listen to the CD as it is played, in order to audibly determine the begin point of a potential sample. When the operator audibly determines that the desirable begin point is near, the Mark button 15 may be pressed. At the exact moment the Mark button 15 is pressed, the time count in screen 41 stops and holds the exact time address that was displayed at the time the button was pressed. This time address and its accompanying track number is now entered as the beginning of the sample. In the same instant the Mark Button 15 was pressed, screen 42 takes over the count as the CD continues to play. Then when the Mark button is pressed again, the time count in screen 42 stops and holds the exact time address displayed at the time the Mark button 15 was pressed, the CD stops playing and the time address displayed in screen 42 along with its accompanying track number will be the end point of the sample.

After all the samples have been entered for experimentation, the user may use the big left and right arrow buttons 16 and 17 to navigate from sample to sample in order to experiment with each one by auditioning them, and editing their time addresses, tempos and volumes. This experimentation process will make the user more familiar with the samples so the user may be better able to recognize the potential of the audio on a CD. And begin to imagine how samples can conceivably connect to themselves in a loop or connect to other samples to form a novel arrangement.

Connecting Samples Creatively

Creative sample connection begins with the user analyzing the timing between the two consecutive samples. As described before, the end time address of one sample should be displayed by screen 41 and the begin time address of the following sample should be displayed by screen 42. When this is so, pressing the Play/Pause button 14 will play 8 seconds of audio, 4 of which will read by the CD Pickup and the other 4 seconds will be retrieved from RAM. This allows the user to hear how the two samples connect, so the user may then decide how to alter the time addresses and the timing between the samples such that they connect in a desirable way. To alter the end time address of the first sample, the user should first make the light above screen 41 aglow. When this is done the CD Pickup will read the beginning 4 seconds of the second sample and store it in RAM. Then the CD Pickup will become poised to play the last 4 seconds of the first sample. When the Play/Pause button 14 is pressed the last 4 seconds of the first sample will be played by the CD Pickup, then the beginning four seconds of the second sample will be retrieved from RAM, 10 microseconds after the first sample has ended. Now hearing how the two samples connect the user may proceed to alter the time address that is displayed in screen 41 by using the triangular shaped arrow buttons 18 and 19 to control the CD Pickup by means of the intratrack scanning function. When the most desirable endpoint of the first sample is found, it may be entered by pressing the Mark button 15. Usually, finding the most desirable time address will include a mixture of slowing the tempo of the audio's play, pausing the audio, and using the intratrack scanning function to repeatedly listen to a certain interval of audio.

The time address displayed by screen 42 can also be altered such that it connects well to the end of the first sample as specified in screen 41. The user will make the light above screen 42 aglow and with this done, pressing the Play/Pause button 14 will play the last few seconds of the first sample by retrieving it from RAM, and the beginning few seconds of the second sample will be played by the CD Pickup. And now the user may proceed to alter the time address in screen 42 so the beginning of the second sample will connect well with the end of the first sample.

As previously described, the user may enter a certain amount of silence between the two samples by placing a track zero entry between them. When this is done, the 8 seconds of audio will still be played half from RAM and half directly from the CD, only one device will transmit audio with a certain amount of timing with respect to the other device as specified by the track zero entry.

Audio Holders

An Audio Holder is a device that can store and retrieve digital audio signals. This invention has 2 main Audio Holders that can each store 45 minutes of audio. These Audio Holders are used in conjunction with the CD transport to connect, blend and/or overlap audio arrangements formed from a single or several compact discs. Audio Holders also allow audio arrangements to be auditioned in their entirety with continuity.

In addition to the two main Audio Holders there is a Short Sample Audio Holder which is the 0.5 MB RAM chip which was described above. This third Audio Holder allows the user to manually add audio to the main Audio Holders by using the Short Sample button 35.

The use of the Audio Holders will usually begin after the user has formed an audio arrangement using the methods described above. This arrangement will then be recorded to an Audio Holder. To demonstrate how an Audio Holder stores an arrangement consider the audio arrangement below.

|  | Sample Address | Tempo | Volume |
|---|---|---|---|
| Sample 1 | Track3,3[00:00.56,00:26.75] | Norm | 06 |
| Sample 2 | Track2,3[04:45.63,00:45.65] | Norm | 07 |
| Sample 3 | Track0 [00:00.56] |  |  |
| Sample 4 | Track2,3[04:45.63,00:45.65] | Norm | 08 |

Since the length of track 2 is not specified, let's posit that this audio arrangement specifies a 12 second interval of audio. When an audio arrangement, such as this, is recorded to an Audio Holder it will be stored as a continuous piece of audio that last 12 seconds. And this 12 second interval of audio will reflect the variations in volume and tempo as they are specified. It can then be auditioned by pressing the Play/Pause button 22. The volume of the arrangement can be controlled by the numbers entered to screen 10 which will affect the volume of the whole arrangement, changing the volumes of the constituent samples equally so that their relative volumes stay proportionate. And likewise, the tempo of the whole arrangement can be affected by the numbers entered to screen 11.

The numbers entered to screens 8 and 9 identify the location of audio stored in an Audio Holder similar to the way screens 41 and 42 identify the location of audio encoded on a CD, that is, the Audio Holders use time addresses. An audio holder with a capacity of 45 minutes can assign time addresses ranging from 00:00.00000 to 45:00.00000, to the audio it stores.

Recording an Arrangement to an Audio Holder

After an audio arrangement has been formed from a CD, the user may record it to an Audio Holder by first selecting one of the three Audio Holders by pressing either buttons 29, 33, or 34. Selecting one of these buttons determines which Audio Holder is accessible by the buttons 22,23,24,35; and screens 8,9,10,11,32 and implied arrow buttons. Recording an arrangement to Audio Holder 1 means pressing button 29. When this is done, the numbers entered to screen 8 will specify where within the Audio Holder the audio arrangement will begin to be stored, for example, if it is a 12 second audio arrangement then entering the numbers(00:00.00) to screen 8 will specify that the audio arrangement should be stored to the location of the Audio Holder that begins at, 00:00.00000 and since it is a 12 second audio arrangement, it will end at, 00:12.00000. And likewise, entering the numbers(44:48.00) to screen 8 will specify that the audio arrangement should be stored to the final 12 second space of the 45 minute Audio Holder.

So after the preferred destination of the audio is specified, the user may specify when the Audio Holder may begin recording with respect to the time shown by the Masterclock screen 13. This is done by entering numbers to screen 32, and pressing the Record/Pause button 24. When this is done, the light above the Record/Pause button 24 will blink indicating that Audio Holder 1 is paused and poised to record at the designated Masterclock time. Then the audio arrangement programmed to be read from the CD must be given a start time with respect to the Masterclock. This time will be entered to screen 6 and the Play/Pause button 14 will be pressed. When this is done, the audio arrangement programmed to be read from the CD will be poised to begin at the designated Masterclock time. The last step in this process is to start the Masterclock by pressing the Start button 25.

If both the audio arrangement and the Audio Holder were designated to start at Masterclock time(00:00.00000), that means that as soon as the Start button 25 is pressed and the Masterclock screen 13 displays(00:00.00000) the audio arrangement will begin to play and Audio Holder 1 will begin to record and they will be in sync to nearest 10 microseconds. The Masterclock will function to allow samples in the audio arrangement to be stored to the Audio Holder with the proper timing between consecutive samples. It will achieve this by suspending its time count for the intervals in which the CD pickup searches for the proper area of the CD to read. When the proper area is found, the Masterclock will resume counting, the audio arrangement will resume playing, and the Audio Holder will resume recording. Both systems being kept in sync by the Masterclock. Now that this audio arrangement has been recorded to Audio Holder 1 we will refer to it as Arrangement 1.

Forming an Audio Arrangement With Respect To Another Audio Arrangement

Now to create a new audio arrangement from a CD to be mixed with Arrangement 1, the Masterclock must again be used to synchronize the endeavor. As described before, the process of forming an audio arrangement from a CD is one of selecting samples one at a time and connecting them. In this case, the samples selected will be tailored to connect, blend, overlap, or otherwise mix with Arrangement 1. The process begins with the user entering a sample to be auditioned from the CD. Then the user will enter to screens 8 and 9, numbers that will define what part of Arrangement 1 is desired to be auditioned. Then these two segments of audio will each be given a time to begin play with respect to the time shown by the Masterclock screen 13. When the Start button 25 is pressed, the user may listen to how the two intervals of audio either connect, blend, overlap, or otherwise mix. Then the user may begin to experiment with the time addresses, volumes, tempos, and/or Masterclock start times of each interval of audio such that they will play in a desirable way with respect to each other. The user may continue the process of audio arrangement forming by entering more samples to be mixed with arrangement 1. After the user has formed an arrangement that mixes well with Arrangement 1, the two arrangements can be stored together as a mix to Audio Holder 2.

To record the mix to Audio Holder 2, button 33 should be pressed, a Masterclock start time should be entered to screen 32 and the Record/Pause button 24 should be pressed. Then button 29 should be pressed, a Masterclock start time should be entered to screen 32 and the Play/Pause button 22 should be pressed. Then a Masterclock start time should be entered to screen 6, and the Play/Pause button 14 should be pressed. Finally the Masterclock should be started.

The Short Sample Audio Holder

The Short Sample Holder is that 0.5 MB of RAM described above and is used to manually add audio to the main Audio Holders with the use of the Short Sample button 35. The Short Sample Audio Holder is accessed and controlled in the same way that the other Audio Holders are, however this Audio Holder behaves like a sampler. Audio stored to this Audio Holder is programmed to be retrieved at the instant the Short Sample button 35 is pressed. Since this Audio Holder is a part of a machine that allows for very creative and unique digital audio arrangements to be stored to it, it is superior to a conventional sampler.

DESCRIPTION

FIG. 2 shows a block diagram of the circuitry that allows for the principle functions of this invention. The signal detection system 45 is responsible for detecting the digitally encoded information on a compact disc. This system includes the CD Pickup and engines that control the rotation speed of a compact disc and what area of a compact disc is optically read. The signal processing system 46 is responsible for the standard decoding, synchronization, demodulation, error correction, subcode processing and other functions required for playing a compact disc. The signal processing system 46 is also responsible for controlling all mechanisms that are capable of changing the bit rate of the audio read from a CD, to allow for the altering of a music's tempo and the assigning of tempos to samples.

The Amplifying means 47 allows for each sample passing through it to be given a specific volume before it is stored to one of the Audio holders, the amplifying means 47 achieves this by amplifying the audio signals appropriately according to the audio arrangement's specifications.

After the audio signals are traveling at the appropriate bit rate and given the appropriate amplification, they may be stored to one of the Audio Holders. The Audio Holders each include their own amplifying means, so that the audio signals they store may be transmitted and stored to another audio holder with altered magnitude.

FIG. 2 also shows the connections between the CD transport apparatus and the Audio holders which allows for audio signals read from a CD to be combined with audio signals transmitted from one of the audio holders, so that the combination of signals may be sent to another audio holder for storage. The Signal Combine system 49 is responsible for combining audio signals from different sources and preparing the combined signals for storage to an audio holder or for direct audibility. For digital Audio Holders, the Signal Combine system 49 may have to decode the digital signals being combined, then reencode the combined signals so that they can be stored using an efficient amount of memory.

CONCLUSIONS, RAMIFICATIONS, AND SCOPE

This invention pioneers a process of audio arrangement forming and processes of mixing audio arrangements. These processes were born from a special insight into music that can appreciate the enormous potential inhering such processes. A potential that may not be obvious until this invention is physically demonstrated.

This invention also introduces a new use for a familiar system in which 0.5 MB of RAM complement a CD Pickup in order to connect samples. This system allows for the auditioning of an interval of audio that cannot be auditioned directly from the CD using the CD Pickup alone. This efficient system allows for the unique process of connecting samples in which a user controls the CD Pickup in order to determine the proper begin or end time address of a sample with respect to the sample that follows or precedes it. There are obvious ramifications to this system, for example, there may be a different amount RAM used or the device used may not be RAM. It could be any device or combination of devices capable of storing and retrieving audio signals in harmony with a timing means. Even an Audio Holder could be used as a CD Pickup complement to allow for the connection of samples. A CD Pickup complement may also allow for the auditioning of an arrangement of samples such that each sample begins at a specific time that is not necessarily unique with respect to the other samples, which would be inclusive of the overlapping and otherwise mixing of samples.

There are other obvious ramifications to this invention, for example, the Short Sample Audio Holder may be completely omitted or the accuracy of the machine's timing means may be decreased or otherwise altered. This is to say that the uniqueness of this invention may be embodied in various ways. So the specific embodiment shown in the drawings and described here in detail should be considered an exemplification of the principles of the invention and should not limit the invention to the embodiment illustrated.

For this patent, there should be noted the distinction between the phrases, "audio arrangement," and, "arrangement of audio signals." An, "arrangement of audio signals," is a generic reference to audio signals that are purposefully arranged. An arrangement of audio signals are not necessarily an, "audio arrangement."

I claim:

1. A machine for forming, storing, and transmitting an original arrangement of audio signals, said arrangement of audio signals being formed from the audio encoded on at least one compact disc and said machine comprising:

a. compact disc player capable of receiving a standard compact disc, reading the digitally encoded information from said compact disc, processing said digitally encoded information toward transmitting the audio signals encoded on said compact disc;

b. a control an display means which allows a human operator to control said compact disc player as to specify what audio is auditioned directly from a compact disc;

c. an audio storage device capable of storing audio signals originating from said compact disc player and used for storing samples read from a compact disc and transmitting stored samples in the order and with the timings specified by a program;

d. a program storage means for accepting and storing said program which specifies what samples should be read from a compact disc, the order in which said samples should be transmitted to audibility, and the timing assigned to each sample which designates precisely when a sample should be transmitted to audibility with respect to the sample that preceded it;

e. an input and display means for entering said program, said program being the product of a process consisting of:

1. auditioning potentially desirable samples, one at a time, directly from a CD, allowing for the comparison of the audio heard with the location of the audio on said disc as shown by said display allowing the user to use said control means to pinpoint the precise location of each desired sample;

2. using said input means to enter the part of a program that specifies what samples should be read from a compact disc and the order in which each sample should be made audible with respect to the others;

3. auditioning the end of each sample along with the beginning of the sample that follows it, in order to determine what time each sample should be transmitted to audibility with respect to the sample that preceded it, and to further pinpoint the precise location of a desirable sample;

4. Assign to each pair of consecutive samples a specific amount of timing that should exist between them;

f. a CD pickup complement that receives and stores audio sent from said compact disc player and is coordinated to work in conjunction with said compact disc player to audition at least two samples, such that each said sample is auditioned at a specific time that is not necessarily unique with respect to the other samples and/or to facilitate the part of said program forming process that allows for the auditioning of the end of one sample and the beginning of the following sample to reflect the specified timing between them.

2. A machine for forming and transmitting an original arrangement of audio signals, said arrangement of audio signals being formed from the audio encoded on at least one optical disk and said machine comprising:

a. optical disk player capable of reading the digitally encoded information from an optical disk, processing said digitally encoded information toward transmitting the audio signals encoded on said optical disk;

b. a control an display means which allows a human operator to control said optical disk player as to specify what audio is auditioned directly from an optical disk;

c. a program storage means for accepting and storing said program which specifies what samples should be read from an optical disk, the order in which said samples should be transmitted to audibility, and the timing assigned to each sample which designates precisely when a sample should be transmitted to audibility with respect to the sample that preceded it;

d. an input and display means for entering said program, said program being the product of a process consisting of:

1. auditioning potentially desirable samples, one at a time, directly from an optical disk, allowing for the comparison of the audio heard with the location of the audio on said disk as shown by said display allowing the user to use said control means to pinpoint the precise location of each desired sample;

2. using said input means to enter the part of a program that specifies what samples should be read from an optical disk and the order in which each sample should be made audible with respect to the others;

3. auditioning the end of each sample along with the beginning of the sample that follows it, in order to determine what time each sample should be transmitted to audibility with respect to the sample that preceded it, and to further pinpoint the precise location of a desirable sample;

4. Assign to each pair of consecutive samples a specific amount of timing that should exist between them;

e. an optical disk pickup complement that receives and stores audio sent from said optical disk player and is coordinated to work in conjunction with said optical disk player to audition at least two samples, such that each said sample is auditioned at a specific time that is not necessarily unique with respect to the other samples and/or to facilitate the part of said program forming process that allows for the auditioning of the end of one sample and the beginning of the following sample to reflect the specified timing between them.

\* \* \* \* \*